United States Patent [19]

Burke

[11] 4,154,618

[45] May 15, 1979

[54] NOVEL COATING COMPOSITIONS

[75] Inventor: Roger Burke, Savannah, Ga.

[73] Assignee: Union Camp Corporation, Wayne, N.J.

[21] Appl. No.: 640,236

[22] Filed: Dec. 12, 1975

Related U.S. Application Data

[60] Continuation-in-part of Ser. No. 501,748, Aug. 29, 1974, abandoned, which is a division of Ser. No. 311,452, Dec. 4, 1972, Pat. No. 3,869,484.

[51] Int. Cl.$^2$ ............... C08G 63/12; C09D 11/08; C09D 11/10; C09D 11/12
[52] U.S. Cl. .................................. 106/27; 106/30; 260/28.5 R; 260/29.2 E; 260/29.6 N; 260/29.6 M; 260/29.6 MN
[58] Field of Search ......... 260/429 J, 29.6 M, 29.6 N, 260/29.6 MN, 29.2 E, 2 M, 404.5, 28.5 R, 534 E; 106/31, 27, 30, 20

[56] References Cited

U.S. PATENT DOCUMENTS

| Re. 29,170 | 4/1977 | Burke | 106/20 |
|---|---|---|---|
| 3,129,176 | 4/1964 | Ihde | 106/20 |
| 3,308,078 | 3/1967 | Rogers et al. | 260/28.5 R |
| 3,328,325 | 6/1967 | Zdanowski | 260/28.5 R |
| 3,474,060 | 10/1969 | Dhein et al. | 260/29.2 E |
| 3,682,688 | 8/1972 | Hughes et al. | 106/20 |
| 3,778,394 | 12/1973 | Lovald et al. | 106/30 |
| 3,819,386 | 6/1974 | Higgens | 106/27 |
| 3,904,569 | 9/1975 | Hekal | 260/29.6 N |

FOREIGN PATENT DOCUMENTS 794434  9/1968  Canada.

Primary Examiner—Theodore Morris
Attorney, Agent, or Firm—McAulay, Fields, Fisher & Goldstein

[57] ABSTRACT

Novel aqueous coating compositions are formed from acidic resins and a metal-polyamine complexer, optionally with organic acids and cometals. The acidic resin is combined with the complexer in the presence of ammonia to form the coating composition, a coordinate which, upon drying, provides films which are water-resistant and have excellent wet/dry rub resistance. The coating compositions are particularly useful for inks, including gravure and flexographic inks.

57 Claims, No Drawings

NOVEL COATING COMPOSITIONS

CROSS-REFERENCE TO RELATED APPLICATIONS

This application is a continuation-in-part of my co-pending application Ser. No. 501,748, filed Aug. 29, 1974 now abandoned for "COATING COMPOSITION AND NOVEL COMPLEXER THEREFOR," which, in turn, was a division of then co-pending application Ser. No. 311,452, filed Dec. 4, 1972, for "COATING COMPOSITION AND NOVEL COMPLEXER THEREFOR," now U.S. Pat. No. 3,869,484. This application is also related to my co-pending application Ser. No. 501,749, filed Aug. 29, 1974, for "COATING COMPOSITION AND NOVEL COMPLEXER THEREFOR." Each of these applications is herein incorporated by reference.

BACKGROUND OF THE INVENTION

The prior art has described the combination of metal salts with polymeric substances, including the use of such salts for complexing organic polymers and resins. Zirconium and zinc, for example, have been employed for the cross-linking of polymer latices. Further, the zirconium and zinc have been used in a complex metal chelate with amine compounds, such as ethylenediaminetetracetic acid for curing acid functional polymers and resins. Such a use is known, for example, in the floor polishing art. When used in that manner, the applied, dried film can be removed only through use of ammonia solutions and other alkalies will not act upon the film. In these uses, the metal ions are attracted to the oxygen-containing groups of the resin and it is for this reason that the ammoniacal solutions will break down the formed film, while other alkalies and detergents will have, essentially, no effect.

For example, the prior art includes disclosures such as in U.S. Pat. No. 3,129,176—Ihde, Jr.—where a metal salt is complexed with a siliceous amino compound which can be used as an additive for printing inks to provide the proper balance of tack, penetration, and viscosity. The amino compound used in that case is a partial amide prepared by reacting a monocarboxylic acid and a polyamine.

Rogers, U.S. Pat. No. 3,320,196, describes a coating composition formed from a polyligand alkali-soluble resin, a polyligand polymer, and a zirconyl-fugitive ligand complex which is capable of undergoing ligand exchange with at least some of the carboxyl groups of the organic film former. One typical complexing agent is ammonium zirconyl carbonate.

U.S. Pat. No. 3,328,325—Zdanowski—teaches a floor polishing composition containing an alkali-soluble resin and the ammonia or amine complex of a polyvalent metal salt where the salt has an appreciable solubility in water. These components form only a minor part of the floor polishing composition which also contains a water-insoluble polymer and a wax. Similar compositions are shown in Fiarman et al, U.S. Pat. No. 3,467,610, and Gehman et al, U.S. Pat. No. 3,554,790.

Ink binder resins have also been neutralized with amine compounds with the formation of ammonium salts. This is shown in a variety of patents including U.S. Pat. Nos. 1,789,783—Silberstrom; 2,449,230—Irion; 2,690,973—Voet; 3,412,053—Pugliese; and 3,470,054—Tyrrell.

In addition to the above, improvements in the usefulness of films formed from acidic resins have been achieved through use of metal compounds, particularly ammonium zirconyl carbonate, and materials similar to it. The use of such zirconium compounds to cross-link polymers formed from aqueous solutions of polyacrylic and polymethacrylic acids is disclosed in U.S. Pat. Nos. 2,758,102—Grummitt et al—and 3,079,358—Uelzmann.

Still further, ostensible complexes of metals, including zinc, with polyalkylene polyamines have been used with resins as catalysts. For example, in British Pat. No. 868,465—Schweizerische Isoia-Werke, published May 17, 1961, a complex formed from an oxide or inorganic salt of a divalent metal, a carboxylic acid or a phenol, and a primary monoamine or polyamine, is employed as the catalyst in the formation of a polyester resin. As pointed out in that patent, however, by the time the polyester resin is formed, the complex has decomposed. Still further, this polymerization is carried out, essentially, under anhydrous conditions. In particular, as noted in Example II, during formation of the complex, the water formed is driven off.

As can be seen, zirconium and zinc are the metals generally employed in the prior art, as they are the most effective known, for cross-linking of acidic resins and other treatments to render them useful in the coating art. While numerous variations exist as to the method of introduction, and the form, of the metal, the performance of all these products is directly dependent on stoichiometry of the metal to the resins' acidity. Primary cross-linking is the result of salt formation between the metal and the resins' carboxyl groups, though some secondary coordination with other hydrophilic groups may occur.

Many other methods exist involving the use of chemical or heat-treatment after film formation to effect improved water resistance, or other useful properties. The prior art also discloses the use of various amines and acidic resins, in both aqueous and organic solvents, to effect improvements in solubility, rheology, and/or final film properties. This is shown, for example, in U.S. Pat. No. 3,615,752—Hoffman, Jr. et al. The use of most amines with acidic resins is limited, however, since these amines tend to form ammonium salts which increase the water-solubility of the resulting films and coatings, due to the amines' limited volatility and residual salt stability. The use of boronated fatty acid polyamide resins in coatings has also been disclosed, as in U.S. Pat. No. 3,786,007—Whyzmuzis et al. Neither of the patents referred to here, however, employed metals for treatment of these acidic resins, except, possibly, alkali or alkaline earth metals.

Despite the extensive prior art, which is represented above, on methods for improving coating compositions derived from solutions of aqueous acidic resins, this resin class remains severely limited in application. In most commercial applications, these resins are used only as modifiers to impart certain desirable properties, such as pigment wetting, but not otherwise, as they lack adequate film performance in critical coating areas when compared to coatings deposited from organic solvents. It is a known disadvantage of water-thinnable resins of this type that, in general, they produce unstable aqueous dispersions and films with lower gloss, poor hardness and abrasion, and poor water-resistance when compared with the conventional, solvent-based coatings.

A further important limitation of known aqueous resin solutions is the higher viscosity of these solutions at the same solids content when compared to solutions of the unneutralized resins in organic solvents. This limitation requires the utilization of a material with a molecular weight insufficient to produce adequate film properties if a workable viscosity is to be maintained. In printing inks, the use of aqueous soluble resins is limited by their inability to dry rapidly and the tendency of water to cause distortion of the paper upon which is is being printed. It is well known in the prior art that printing with water-based inks results in much slower dry rates as compared to similar resin solutions made with volatile, organic solvents. Another known disadvantage of the water-thinnable resins is their inability to wet various non-porous substrates, which results in excessive crawl and poor ink lay.

In protective and decorative coatings, water-thinnable alkyd resins have the known disadvantage that, in general, they produce unstable aqueous dispersions and are characterized by films of poor gloss, hardness, and water-resistance. Numerous methods have been disclosed for improving the performance of such water-thinnable alkyd resins in the preparation of lacquers and paints and, exemplary of such methods, are those disclosed in U.S. Pat. No. 3,376,241—Que. Frequently, these resins are modified by reacting them, either during or after preparation, with drying or non-drying oils, oily fatty acids, resin acids, phenols, urea, or melamine-formaldehyde resins in an effort to improve film-forming properties of these coatings, such as hardness, toughness, and flexibility. Important criteria for commercial acceptance of water-dispersible coating compositions, particularly water-thinnable alkyd resins, are dispersion stability, dilutability with water, ease of preparation, surface adhesion, film-resistance to water and alkali, and the ability to air-dry, particularly in regard to the drying rate and the ultimate properties of the cured material.

The material of the present invention provides for water solutions of acidic resins which eliminate many of the disadvantages referred to above and for a method for preparing such materials.

SUMMARY OF THE INVENTION

In accordance with the present invention, film-forming vehicles of improved usefulness, composed of particular acidic resins in aqueous solution, are formed when the acidic resins are modified with a complexing agent which is a polyamine-zinc material. The use of these polyamine-zinc complexing agents results in coatings having a combination of solution properties and film characteristics which are both novel and unanticipated. The combination of the particular acidic resin and the polyamine-zinc complexing agent results in coatings of improved rheology, film hardness and abrasion resistance, water and heat resistance, solvent resistance, and adhesion. Further, these coatings can show improved dry rates, both in the sense of air and forced heat dry, particularly when compared with aqueous solutions of similar acidic resins without the complexing agent of the present invention. These coatings may be applied by a variety of methods including conventional printing techniques. Additionally, through use of the polyamine-zinc complexing agents, many acidic resins can be dispersed in water, resulting in solutions of improved stability and low aqueous viscosity. The important consideration is the overall combination of a group of properties for a particular use, rather than, specifically, a singly improved property.

The properties of the product are, in general, not dependent upon the stoichiometric relationship of the material contained in the complexing agent and the oxygen-containing group of the acidic resin.

According to the present invention, the coating composition can be formed as an aqueous solution of the complexer and the acidic resin which may be either clear or pigmented. The solution dries under ambient conditions and becomes resistant to water, exhibiting an extremely high rate of dry. This high rate of dry is enhanced by forced air or heating. This is true whether the coating composition is clear or pigmented. The coating compositions according to the present invention, in the form of aqueous solutions, exhibit viscosity stability on storage over a considerable period of time, such as several months and, when dried, produce films of extremely high gloss.

Extremely important in the practice of the present invention is the complexer which coordinates with the acidic resin in the coating composition to form the film having, inter alia, high gloss, high wet/rub resistance, and quick drying properties. As previously indicated, it is not a single property which is important, but an overall combination of properties which is developed with the composition of the present invention. An essential component of this complexer is a metal, which can be added in the form of the metallic compound, such as an oxide, a salt, or a soap, and an amine. The metal is one which has a coordination value in excess of its valence including, for example, zinc, zirconium, cobalt, and nickel. The particularly preferred metal is zinc, primarily for reasons of econonmy. Zinc, for example, has a valance of 2+ but a coordination value in compounds of up to 6+. For various purposes, others of the metal listed can be efficaciously employed.

Zinc-based complexers which are prepared with metal coordination values of from about 3.5 to 5.5 have several significant performance characteristics when employed in the final coating composition, For example, the final coating compositions made with such complexers exhibit improved holdout on paper. The films formed from these coating compositions also exhibit faster development of water resistance and a superior final water resistance.

The amine employed as an essential portion of the complexer is a polyalkylene polyamine of the formula:

$$NHR\text{-}[(CHR)_aNH]_nR', \qquad (1)$$

where a is from 2 to 3, n is from 2 to 5, and each R and R' is individually selected from the class consisting of hydrogen and methyl; where up to 55% of the polyalkylene polyamine can be replaced with a hydrocarbon coamine having an amine equivalent weight of between 35 and 120. Preferred polyalkylene polyamines of formula (1) include those where a is 2, n is from 2 to 4, and R and R' are each hydrogen. The most preferred polyalkylene polyamine is triethylene tetramine. It will be appreciated that though the definitions for a and n describe a range of whole numbers, the range includes fractional numbers, i.e. mixtures of various polyalkylene polyamines, the average values of which for a and n will fall within the defined ranges. Preferred hydrocarbon coamines are piperazine, bis (aminopropyl) piperazine, and bis(hexamethylene) triamine.

The ratio of the metal to the amine in the complexer is particularly important in determining the properties of the ultimately formed film from the coating composition. In general, there should be from 0.9 to 6 moles of amine for each mole of metal, but the specific ratio will depend upon the properties desired in the ultimately formed film. For example, when ultimate wet/rub resistance is desired the preferred ratio is 3.5 to 5.5:1, most preferably 4.7:1. When optimum drying rate is the desired property, the preferred ratio is 0.9 to 1.5:1.

An optional component of the complexer is an acidic material, such as, monobasic or dibasic aliphatic carboxylic acid. Such acids can improve the rate of metal chelation and improve both the solubility and solution stability of the final, aqueous vehicle as well as of the complexer. The amount of acid present can vary from 0 to 1 mole for each mole of metal, preferably from 0.25 to 0.75 mole, and most preferably from 0.25 to 0.5 mole of acid for each mole of metal. Monobasic aliphatic acids include the $C_6$ to $C_{18}$ acids, while the dibasic acids include those in the range of $C_4$ to $C_{12}$. If desired, aromatic acids can be used. The amount of acid to be employed can be based, more realistically, on the amount of polyamine present in the complexing agent, as this relates both the amount of the acid and the amount of metal to the polyamine. On that basis, the modifying acid, when one is used, will generally be in the range of from 1 equivalent of an acid or acidic material for each 0.25 to 2 moles of polyamine contained in the complexing agent. A more preferred range is one equivalent of acid for each 0.5 to 1 mole of polyamine. The water reducibility and viscosity of the final, aqueous vehicle can be strongly affected by the character of the particular acid modifier.

A further optional component of the complexer is a cometal to be used in conjunction with the metals described above. Such cometal need not necessarily have a coordination value in excess of its valence.

The method of preparation is important and significantly different products can be produced employing the same composition. Two preferred methods exist for the preparation of the novel vehicles of the present invention. The first method involves the preparation of the complexer independent of the aqueous acidic resin dispersion and the second involves preparation of the complexer in situ with addition of the acidic resin. It has been found that these two methods optimize both the performance value and the process time required to achieve these properties.

In the first method, the metal-amine complexer is formed in an aqueous solution with a maximum of 70 percent solids. Preferably, the solids content of the solution is approximately 50 percent. A separate dispersion of the acidic resin, neutralized with ammonia to a pH of approximately 6.5 to 7.5, is formed into a workable dispersion after which the complexer solution is added, preferably at a temperature of greater than 70° C., most preferably at reflux. After this addition, the solution may be cooled to 65° C. Cooling is not essential to achieving desirable properties, but does provide varnishes of improved solution color. Such cooling is desirable, but not essential. Depending upon the end use, adjustment is made to the finally desired pH of about 8.0 to 10.0. Non-volatile and pH adjustments are made with addition of ammonia or water.

In the second, or in situ method, of complexer formation, the complexer is prepared in all of the water which is to be included in the ultimate coating solution or varnish. A quantity of ammonia is then added to the dilute complexer solution, and the desired acidic resin is added at approximately the reflux temperature of the composition. This mixture, with the undissolved resin particles, is heated to reflux until solution or until a homogeneous dispersion is formed, and is then cooled to 65°. The pH and non-volatile content are adjusted as in the first method.

A large number of acidic resins may be employed in forming the vehicle of the present invention. These acidic resins generally have an acid number of from about 30 to 400, preferably from about 50 to 300 and are capable of coordination to a metalamine complex in aqueous solution. The choice of the resin is primarily based upon the end use in which the coating composition is to be applied. Among the resins which can be used according to the present invention are polyester resins, such as those formed by the condensation of a polybasic acid and a polyhydroxy alcohol and such resins which are modified with fatty acids or oils, rosin, and rosins modified with materials such as maleic, fumaric, and acrylic acids, and their esters capable of alkaline dispersion. Portions of the preferred acidic resins just described can be replaced with other acidic resins which function as co-acidic resins. Included among the usable co-acidic resins are copolymer products resulting from the vinyl polymerization of styrene and maleic anhydride; alkali dispersible esters of epoxy resins such as those disclosed in U.S. Pat. No. 3,355,401—Tanner; acrylic acid polymers, copolymers, and related monomer acids capable of alkali dispersion; shellac and related naturally occurring resin acids; and blends of the foregoing acidic resins.

The various acidic resins referred to above must be capable of effective alkaline dispersion of pH's of from about 4.0 to 7.5, preferably 5.0 to 7.5. These dispersions need not be clear or stable, but need only be workable, primarily in the sense of viscosity and suspension, in such a way that the complexer can be effectively added at temperatures to reflux. To some degree, however, the stability of the resulting coating composition is adversely affected as the solubility of the resin decreases in aqueous alkali solution.

The amount of acidic resin incorporated is dependent, in general, on the amount of free amine present in the complexer. The free amine is that portion of the polyamine equivalents which remain unreacted by either the metal in the complexer or the modifying acid, when it is present. The best method of measuring these values is based upon the equivalent weight. Thus, the ratio of the free amine in the complexer to the carboxyl groups in the resin should approximate 1:1 based upon the equivalent weight ratio. This ratio provides the maximum in wet/rub and water resistance. The lower limit of the ratio is approximately 0.4:1, and such compositions generally show a decrease in varnish viscosity and thixotropy, with an increase in block point.

The solids content of the coating compositions of the present invention can vary from about 15 to 70 percent by weight. The upper limit is imposed by formability and the lower, generally, by economics.

In addition to the materials referred to above, various modifying agents can be incorporated. Included among the modifying agents are a cosolvent, in place of a portion of the water, in formation of the complexer or as an addition to the final coating composition. In particular, alcohols and esters have proven effective in, for example, modification of viscosity. Various antifoam agents can be added, particularly the silicones. Further, protective colloidal and surface active compounds can be included in the composition for particular purposes.

DESCRIPTION OF THE PREFERRED EMBODIMENTS

As previously indicated, the invention is directed to novel, aqueous, acidic resin vehicles from which films may be formed for use as coating compositions, including ink compositions. More specifically, the invention is directed to essentially aqueous solutions comprising an acidic resin and a polyamine-zinc complexing agent which interact in formation of the film. It has been found that useful vehicles comprise an acid resin with an acid number of from about 30 to 400, preferably 60 to 350, and certain polyamine-zinc complexing agents which will yield films from aqueous solution, the films, on drying, becoming resistant to the solvent effects of water and exhibiting other useful properties.

The aqueous resin vehicles of the present invention are homogeneous and have a pH within the range of about 7 to 10. They have three essential components:
1. An acidic resin.
2. A polyamine-zinc complexing agent.
3. Ammonia.

The ammonia, listed as a separate, essential component of the composition is necessary to develop the properties of the resin vehicle. In particular, it is essential for initial water solubility, with film properties being developed by its evaporation. To a great extent, the ammonia acts as a fugitive catalyst, so that it is not critical as such, while its role in development of the coating is important.

Various organic, acidic resins containing carboxyl functionality have been found to be capable of coordination to a polyamine-zinc complexing agent for use in forming films according to the present invention. As used in the present application, coordination refers to association or combining with, not necessarily to a coordination bond. While the mechanism involved in coordination of the acidic resin and the polyamine-zinc complexing agent are not understood, the exceptional stability of the coatings formed from this mixture of materials, in solution as well as in the solid state, is believed attributable to the efficient coordination of the cation by nitrogen, and the subsequent stabilization of the amine salts formed between the resin carboxyl functionality and the amine groups of the complexing agent. This explanation is given merely by way of theory and is not meant, in any way, to delimit the present invention.

The resinous vehicle formed by the mixture of the acidic resin and the polyamine-zinc complexing agent is a stable, aqueous composition containing from about 15 to 70 percent, by weight, of solids. In addition to the three essential components referred to above, various modifying agents, as will be set forth hereinafter, can be employed.

The particular acidic resin which is used in the resinous vehicle is primarily determined by the use to which the vehicle is to be put. The resins found most useful are those having an acid number of between 30 and 400, preferably between 50 and 300, and most preferably between about 75 and 250. As used herein, acid number defines the number of milligrams of KOH equivalent to the carboxyl groups present in a 1-gram sample of the resin. Thus, the acid number is an indication of the unreacted, free carboxyl groups present in the resin.

Acidic resins which may suitably be used according to the present invention can be either liquid or solid at ambient temperatures. When the resinous vehicle composition of the present invention is to be used in inks, whether clear or pigmented, a melting point, as measured by Fisher-Johns apparatus, of at least about 50° C. is required. More preferably, the melting point, which is actually a thermoplastic softening point, should be in the range of from about 90° to 160° C., most preferably from about 110° to 145° C. Acidic resins which are employed, according to the present invention, for protective or decorative coatings need not be solid or non-blocking at ambient temperatures. However, such resins should contain unsaturated fatty acids which can be air dried to form hard, flexible films. Such coating vehicles are useful for the production of paint and lacquers, impregnants, and adhesives.

Another important factor in the selection of the acidic resin to be used in the resinous vehicle of the present invention is the fact that it must be capable of ammoniacal dispersion at pH's of from about 4 to 9, preferably 4 to 7.5; most preferably 5 to 7.5. The specific pH will vary, within this range, for each individual resin selected. As previously, indicated, however, the acidic resin is selected based upon total application performance, and it is not necessary to limit the choice of resin to those with high aqueous alkaline solubility.

Preferred acidic resins which have been found useful in the practice of the present invention are derived from materials comprising rosin, fatty acids with from 4 to 22 carbon atoms, monobasic acids, polybasic acids, and the esters and polyesters of these acidic materials. A major requirement, in accordance with the present invention, is that these acidic materials be reacted and/or used in proportions to yield an acidic product having an acid number of from about 30 to 400, preferably 50 to 300, which is capable of alkali solution or dispersion in an essentially aqueous medium.

A particularly useful group of acidic resins for use in the present invention has been found to be those derived by the Diels-Alder reaction of rosin with an $\alpha,\beta$-unsaturated olefinic dicarboxylic acid or anhydride, and the partial esters of these reaction products. The term "rosin" is employed here to include gum, wood, and tall oil rosins. A major component of the rosins referred to is abietic and abietic-type acids which contain conjugated unsaturation and are capable of undergoing a Diels-Alder reaction with an $\alpha,\beta$-unsaturated dicarboxylic compound. Most preferably, these unsaturated dicarboxylic compounds are aliphatic compounds containing from 4 to 6 carbon atoms. Suitable acids include maleic, fumaric, and itaconic acids and anhydrides. Other aliphatic or aromatic acids can be used to advantage in forming the acidic resins to be employed in this invention. Such acids include phthalic, isophthalic, terephthalic, tetrayhdrophthalic, benzoic, succinic, adipic, and sebacic acids and anhydrides. It may be desirable, depending upon the end use, to employ two or more acids or anhydrides together. For example, a mixture of rosin, maleic anhydride, and phthalic anhydride can be used where the maleic anhydride is adducted to the rosin, and the subsequent mixture of the rosin-maleic adduct and the phthalic anhydride is partially esterified with a suitable alcohol. Any of the polyesters describes can be employed in the present invention so long as they are capable of alkaline dispersion within a pH range of 4 to 9, preferably 4 to 7.5, most preferably 5 to 7.5, and have an acid number in the range of from about 50 to 300, preferably about 120 to 250.

Another group of acid resins, useful in accordance with the present invention, can be described as oil-modified polyester or alkyd resins. These may or may not contain rosin. Alkyd resins which can be used in the present invention are those known in the art to be soluble and/or dispersible in essentially aqueous alkaline materials, such as ammonia or an amine. They are derived from a polyhydric alcohol, a polybasic acid, and fatty oils or fatty acids. The oils used to modify the alkyds may be non-drying, drying, or semi-drying oil or the saturated or unsaturated fatty acid derived from such oils. Examples of such modifiers are linseed oil, soy bean oil, dehydrated castor oil, oiticica oil, safflower oil, coconut oil, and fatty acids derived from such oils and tall oil fatty acids, among others. Air drying fatty acid modified polyesters are described, for example, in U.S. Pat. No. 3,494,882, and that portion of that patent is herein incorporated by reference. The alkyd resins which are useful in the present invention are characterized by a high acid number and may include a high content of hydrophilic groups, such as amine, ether, carbonyl, and, particularly, hydroxyl groups. These resins should have an acid number of at least 40, with a more desirable range of from about 70 to 150. If desired, these alkyd resins can be modified with drying or non-drying oils and natural or synthetic resins. In addition, more than one polyhydric alcohol or polybasic acid can be used in the same alkyd resin when special properties are desired.

In forming the polyester-type of acidic resins referred to above, a wide variety of alcohols can be employed. Among the typical polyhydric alcohols are ethylene, propylene, and butylene glycols, glycerine; pentaerythritol; trimethylol ethane; trimethylol propane; sorbitol; di-pentaerythritol; tri-pentaerythritol; neopentyl glycol; and dimethylol propionic acid. Also useful are amine and blocked amine alcohols such as tris(hydroxymethyl)aminomethane and triethanol amine. Additionally, monofunctional alcohols, including, generally, those having from 1 through 12 carbon atoms, can be used effectively to reduce the acid number, while acting as chain stoppers, and to maintain a desired average molecular weight. Preferred alcohols are those having from 3 to 8 carbon atoms, such as isopropanol and amyl alcohol. The polyester acidic resins are prepared by various means known to those skilled in the art, and no purpose would be served in a detailed description of such methods of preparation. Acidic resins of the type referred to are readily available commercially, and these commercial materials can be used in the preparation of the resinous vehicle of the present invention.

As previously indicated, an important part of the resinous vehicle of the present invention, and the crux of the coating composition, is a polyamine-zinc complexing agent which coordinates with the acidic resin, both in solution and in the dried film, to give coatings whose properties are both novel and unanticipated. The essential components of the complexing agent are a metal, which can be added in the form of a metallic compound, a polyamine, and water. Among the metallic compounds which can be employed are oxides, salts, and soaps. A necessary requirement for proper formation of the complexing agent is that the metal and polyamine be combined in the presence of sufficient amounts of water.

It is believed that the metal portion of the complexing agent acts, essentially, as a nucleating agent to create a "bundle" of amine groups.

The metals which can be employed in forming the complexing agent employed in the resinous vehicle of the present invention are those which are capable of coordination values in excess of their valence. Such metals include zinc, zirconium, nickel, and cobalt. The preferred metal is zinc. For various purposes, however, other metals can be used in conjunction with the zinc to achieve special properties. The zinc-based complexing agents are preferred, primarily, for reasons of economy, stability, and color.

Among the metals which can be used in conjunction with the zinc are members of the alkali and alkaline earth groups, particularly groups 1A and 2A of the periodic group. These can effectively be used in the form of their salts, oxides, and soaps. Particularly useful cometals are lithium, magnesium, and barium. Through the proper selection of the cometal, it is possible to alter the solubility characteristics, improve the dry rates, and achieve other important and desirable properties in the final aqueous coating material. However, the use of these cometals with zinc is not essential to the basic mechanism, and they merely enable the broader application of preferred coatings. For example, such properties as water-dilutability, dry rate, etc., which can be modified through the choice of a cometal, can also be modified by changing other components of the resinous vehicle.

The amine component of the polyamine-zinc complexing agent comprises one or more polyfunctional amines. Included within the polyamines which can be employed are polyalkylene polyamines of formula (1). Included within formula (1) are such polyalkylene polyamines as diethylene triamine, di-1,3-propane triamine, di-1,2-propane triamine, triethylene tetramine, and tetraethylene pentamine. In conjunction with the polyalkylene polyamines of formula (1), co-hydrocarbon amines can be employed. These hydrocarbon amines are employed in amounts of from 0 to 55 percent of the total amine equivalents present, and their amine equivalent weight must be between 35 to 120. Preferred co-hydrocarbon amines are piperazine, bis (aminopropyl) piperazine and bis(hexamethylene)triamine.

The amine equivalents, just indicated, is defined as the number of milligrams of potassium hydroxide equivalent to the basicity in one gram of the sample. A suitable test method for determining this is ASTM D2074-66, "Standard Method of Test for Total, Primary, Secondary and Tertiary Amine Values of Fatty Amines by Alternative Indicator Method." The equivalent weight of a particular amine can be determined from its amine number. Amine number and equivalent weight, as is well known, are interchangeable values in the sense of being able to determine one from the other.

Preferred amounts of the copolyamine, when employed, are from 20 to 45 percent of the total amine equivalents. Selection of the co-amine is based upon total performance and economic requirements. The essential effect of the co-amine is to act as a diluent to the primary polyamine. Total performance properties may, or may not, be affected. Thus, a decrease in a particular performance property may be acceptable if justified by the resulting effect on economics, though use of particular co-amine may result in improved performance.

In addition to the preferred co-hydrocarbon amines described above, the homologues of piperazine can be employed. In addition, the stripper, or bottoms cut, from the manufacturer of bis(hexamethylene)triamine can be used. This latter product is particularly useful for reasons of economy and is an excellent, low-cost diluent for the most preferred polyamine, triethylene triamine. Piperazine, and its homologues, provide for improved water resistance in particular coatings, though, potentially, at a significantly increased cost.

The preferred polyalkylene polyamine within formula (1) are diethylene triamine, triethylene tetramine, and tetraethylene pentamine, and their mixtures. The most preferred of these, from the standpoint of overall performance and economics, is triethylene tetramine.

The ratio of metal to amine in the complexing agent is particularly important in setting the properties of the film ultimately formed from the coating composition. In general, there should be from about 0.9 to 6 moles of amine for each mole of metal. The specific ratio of metal to amine will depend upon the properties desired in the final film. In general, coatings having the highest water resistivity in the cured film are characterized by high molar ratios of amine to zinc, while coatings having the highest rate of dry are formed from complexing agents having a low amine-to-zinc molar ratio, as previously indicated.

It has been found that various mono- and poly-functional carboxylic acids, when present during the formation of the initial polyamine-zinc complexing agent, can have a considerable and useful effect on various performance properties in the final coating. While these carboxylic acid modifiers can be used, they should not be considered as essential, the essential components of the complexing agent being the metal and the polyamine. The use of modifying acids in the formation of the complexing agent enables broader application of coatings derived from any given acidic resin. Thus, the modifiers make it possible to alter important coating properties, such as viscosity, dry rate, gloss, hardness, and abrasion resistance. However, these changes can also be effected by altering the character of the acidic resin. The choice of which component to vary to create the variation in final properties is, in general, dependent upon the economics of the situation and whether the user is in a better position to change a modifying acid in formation of the complexing agent or to change the acidic resin which is to be used when different properties are desired or required. Similarly, most of the changes accomplished by inclusion of the modifying acid could be accomplished by varying the molar ratio of metal to polyamine and the weight relationship of the complexer to the acidic resin.

When an acid modifier is used in forming the complexing agent, the preferred acids are the aliphatic $C_6$ to $C_{18}$ monocarboxylic acids, preferably $C_8$ to $C_{14}$, and most preferably $C_{12}$ to $C_{14}$. The molar ratio of acid to metal in the complexer, when these modifying acids are used, is in the range of from 0 to 1:1, preferably from 0.25 to 0.75:1, and most preferably from 0.25 to 0.5:1. The maximum limit on the acid is imposed because of the plasticizing effect which it imparts to the complexer, as well as the lowering of the free amine component of the complexer. As previously indicated, it is the free amine component of the complexer which coordinates with the acid groups of the acidic resins in the resinous vehicle.

In addition to the aliphatic, monobasic carboxylic acids, aliphatic dibasic acids of $C_4$ to $C_{12}$ and dimerized fatty acids can be employed. Included among these acids are such materials as adipic acid, azelaic acid, sebacic acid and the dimerized $C_{18}$ fatty acids. Further, aromatic and cycloaliphatic acids such as phthalic and tetrahydrophthalic and their anhydrides can be used. Though these acids do aid in the drying properties of the ultimate coating composition, they may also cause an approach to the viscosity and insolubility limits in the aqueous medium.

The most important properties controlled by use of an acid modifier or modifiers in formation of the complexer are water dilutability, dry rate, viscosity of clear and pigmented films, and gloss finish. In general, acid modifiers which improve water dilutability will decrease dry rate and viscosity. The tendency to affect water dilutability is controlled by the acid modifier's general ability to form an aqueous alkaline solution or dispersion. Thus, for example, with straight-chain fatty acids, lauric acid ($C_{12}$) gives products of superior water dilutability when compared to stearic acid ($C_{18}$). While, for this groups of acids, $C_{14}$ has been found to give the best overall balance of properties, this overall balance is best obtained as judged by overall performance of the various tests used by compounding a blend of $C_{12}$ and $C_{18}$ acids to give an average molecular weight equal to $C_{14}$ acids. Polymerized $C_{18}$ acids give solubility significantly better than the straight-chain, saturated stearic acid. Other acids, such as isophthalic acid, give properties analogous to the straight-chain acids, but they differ in overall balance of properties. Similarly, mixtures of aromatic acids with similar or different modifying acids will produce a product with a unique balance of properties. The final selection of the acid modifier, when one is employed, is controlled by the acidic resin used, its relationship to the complexer, and the properties desired in the final coating.

The amount of acid modifier to be employed, when one is used, has previously been given, based upon a ratio of that acid to the metal in the complexing agent. However, the amount of acid to be employed can more realistically be based upon the amount of polyamine present in the complexing agent. On that basis, the modifying acid, when one is used, will generally be in the range of from 1 equivalent of an acid or acidic material for each 0.25 to 2 moles of polyamine contained in the complexing agent. A more preferred range is 1 equivalent of acid for each 0.5 to 1 mole of polyamine.

It has been noted that the choice of acid modifier in the complexing agent, when such a modifier is used, affects certain properties of the final material. These effects are qualitatively predictable. The effects vary with the mixture of materials and the other components present, and the direction of change can always be predicted, based upon the material used. For example, a series of coatings was prepared using the same acidic resin and zinc-polyamine complexing agent but using different acid modifiers in the complex, the modifier being selected from the group of saturated, aliphatic, monobasic acids having from 8 to 18 carbon atoms. The ratio of acid equivalents to moles of polyamine was held constant. The final coatings prepared using these complexing agents were evaluated for water reducibility, dry rate, and solution viscosity. It was found that as the chain length of the acid modifier increased, there was a corresponding increase in viscosity and dry rate but a decrease in water dilutability of the final coating material. When a mixture of two acids was used, for example, $C_8$ and $C_{16}$ acids blended to an acid equivalent weight equal to $C_{12}$, the coating prepared using the mixed acids gave a balance of coating properties superior to $C_{12}$ acids alone. The acid modifiers employed, which are not necessarily carboxylic acids, which have been found particularly useful for modifying the resinous vehicle coating compositions of the present invention include $C_6$ to $C_{18}$ saturated fatty acids, oleic acid, the polymerization products of $C_{18}$ unsaturated fatty acids, isophthalic acid, phthalic anhydride, trimellitic anhydride, adipic acid, alcohol-soluble rosin-maleic, Bisphenol A, and copolymers of stryene-maleic anhydride and their mixtures. In general, most acidic materials can be used to effect changes in the coating composition. However, factors such as economy, availability, and convenience, in addition to the development of desirable properties in the final coating, limit those materials which are of commercial interest.

It is essential that the metal-polyamine complexing agent be prepared in an essentially aqueous medium in which the metal, polyamine, and optional acid modifier constitute not more than 75 percent by weight of the solution, that limit being required for manufacture or use. If desired, co-solvents can be employed, but there must be at least 33.5 percent water, by weight of the complexing agent, present. A preferred range is from about 50 to 250 percent, by weight, based upon the weight of the components of the complexing agent.

For the prefered resinous vehicle coating compositions of the present invention, the metal-polyamine complexing agent is formed independent of the acidic resin and ammonia to be employed in the final coating. The complexing agent may, however, contain part or all of the water and optional co-solvents and other modifiers, such as antifoaming agents, ultraviolet absorbers, or anti-oxidants, to be contained in the final coating composition.

The formation of the metal-polyamine complexing agent proceeds slowly at temperatures of less than about 65° C. Generally, it is convenient to conduct the reaction of the materials at elevated temperatures, such as reflux. The specific temperature of reflux will, of course, depend upon the amount and type of co-solvent used, if any. Under atmospheric conditions, a desirable temperature range is from about 75° to 105° C., reflux to be carried out for 1 to 2 hours. A preferred temperature is approximately 85° C. under atmospheric conditions. If pressure is used, higher temperatures can be employed without adversely affecting the ultimate complexing agent.

Two methods are available for formation of the complexer and the final coating composition. The first method involves formation of the complexer in a first treating vessel, partial neutralization of the acid resin separately, and blending of the two materials followed by dilution to the desired concentration level. In the second method, the complexer is formed in situ in essentially all of the ultimately desired amount of water. Ammonia and the acid resin are then added to the solution of the complexer to form the finally desired coating composition.

According to the first method, the metal and amine which are to be complexed are added to an aqueous solution with any acid modifier which is to be incorporated, in the amounts previously disclosed.

The desired acid resin which is to be blended with the complexer to form the final coating composition is dispersed in water by the formation of a partial ammonium salt. The pH of this solution must be kept low as water resistance and other desirable properties can be adversely affected in the finally formed film. A pH of approximately 6.5 to 7.5 has been found satisfactory, and this corresponds, for example, with rosin-maleic acidic resins, to a neutralization of from about 25 to 40 percent of the acid carboxyl groups present on the resin. At pH's below this desired range, most of the acid resins either from heterogeneous dispersins, which cannot be properly worked, or have unreasonably high viscosities.

Following formation of the desired resin dispersion, the dispersion is heated to approximately 85° and the complexer solution is added. When the temperature of addition is below 85° C., the rate of desired coordination of the resin and complexer is adversely affected. For example, with rosin-maleic resins, effective coordination does not occur at temperatures below 65° C. After addition of the complexer has been completed, the solution is cooled to 65° C., and the pH and non-volatile content of the coating composition are adjusted with ammonia and water. The pH and non-volatile content which are desired are dependent upon the ultimate use. For example, when the coating composition is to be employed as a printing ink vehicle, the preferred pH is approximately 8.5, and the non-volatile content is about 50 percent, or greater. For other uses, such as overprint varnishes, a pH of 7.5 to 8.5 is preferred.

In the second method of forming the coating composition, the in situ method, the complexer is prepared in the presence of all of the water or co-solvents which are to be present in the final coating composition. The complexer and solvent mixture are heated to reflux for times and temperatures dependent upon the particular composition involved. For example, when the composition is 188.8 parts water, 63.1 parts isopropanol, 29.2 parts triethylene tetramine, 13.1 zinc oxide, 13.4 lauric acid, and 23.2 parts stearic acid, refluxing was carried out at 83°–85° C. for a period of one to two hours. If adequate initial chelation is not obtained in this step, the performance properties of the final coating composition are adversely affected with, in particular, a significant lowering of the dry rate. After formation of the coordinate through reflux, a quantity of ammonia sufficient for adequate dispersion in the first method is added to the dilute coordinate solution, and the desired amount of resin is then added, the last step preferably being carried out at a temperature of about 75° to 80° C. The entire mixture is then heated to reflux and held there until the resin is found to be in solution. The coating composition is then cooled to 65° C. and the pH and non-volatile content adjusted as in the first method. Generally, a temperature of at least 75° C. in the refluxing step is required for adequate coordination.

While each of the two methods above have involved the use of either solid or cooled resins, the resin may equally well be employed in a molten condition. Similarly, while aqueous ammonia, such as a 26° Baumé ammonia, is generally employed in formation of the coating compositions, gaseous ammonia may be used with effective results.

The present invention provides a means for producing a wide variety of aqueous resinous coating compositions from a single acidic resinous material for use of a metal-polyamine complexing agent, which may optionally be modified with a cometal selected from the group consisting of alkali and alkaline earth metals and an acid modifier within a range of about 0.25 to 2.0 acid equivalents per mole of amine. Conversely, a single metal-polyamine complexing agent can be used effectively to form a wide variety of aqueous resin coating compositions from different acidic resins having both novel and improved coating properties.

The ammonia, which has previously been indicated as an essential component of the resinous vehicle, is employed in amounts sufficient to achieve the desired pH in the final coating composition. The optimum amount will depend upon the acid number of the acidic resin used and its weight relationship to the metal-polyamine complexing agent. For most coating compositions, both clear and pigmented, it has been found that a desirable pH range is from about 7.3 to 10.0, with a pH range of 8.0 to 9.0 being preferred. In preparing the preferred coating compositions of the present invention, it is important to exclude ammonia from the metal-polyamine complexing agent reaction. As indicated, the ammonia can be added as a gas or an aqueous solution. Ammonia is the preferred base to be employed in accomplishing the pH adjustment as it rapidly volatilizes from the coating film application and thus does not impart water sensitization, discoloration, or inhibition of drying of the deposited film.

The two methods of forming the complexing agent to be employed in the resinous vehicle of the present invention have been described. These methods differ, primarily with regard to the physical form of the acidic resin and with regard to the method of introducing the acidic resin and the metal-polyamine complexing agent. In the first method, the acidic resin is pre-dispersed in an aqueous, ammoniacal solution, which may optionally contain a co-solvent or other additives, such as an antifoam agent, to be employed in the final coating composition.

In the second method, the desired metal-polyamine complexing agent is first formed in the water and an optional co-solvent which is to be used in the final coating composition. The acidic resin, in the form of a solid or molten liquid, along with the ammonia as just described, is then added. The ammonia may be added prior to addition of the acidic resin, or gradually and continuously throughout the resin addition. The choice of which method is employed for formation of the final coating composition is dependent upon the form, source, and type of acidic resin and/or on the equipment which is available or to be used.

In both of the methods of forming the coating composition, after combining of the metal-polyamine complexing agent and acidic resin, the mixture is heated with agitation to a temperature of at least 60° C. If optimum properties are to be obtained, the resulting mixture should be in a pH range of from about 6.5 to 7.5. Below this pH, most acidic resins do not form a homogeneous dispersion, or have an unreasonably high viscosity. Preferably, the components are heated to reflux, a temperature depending upon the boiling point of water and the presence and amount of co-solvents. Preferably, the temperature is held at about 80° C. for about 1 to 2 hours. Increasing pressure, while maintaining temperature, or using a higher temperature under increased pressure, allows for a reduction in the amount of ammonia necessary to achieve a workable dispersion. The ammonia required for the final coating would then be added after interaction of the acidic resin and the metal-polyamine complexing agent.

The pH maintained during interaction of the acidic resin and the metal-polyamine complexing agent is extremely important. So long as the pH is below about 7.5, there are no differences observed in the resulting coatings, so long as the initial coating composition is workable. However, above a pH of about 7.5, preferred properties are gradually lost, for example, the desired rheology, , wet-rub abrasion, and drying rate.

After formation of the interaction product between the metal-polyamine complexing agent and the acidic resin, the resulting solution or dispersion is cooled to about 65° C., or less, and final pH and non-volatile adjustments are made. If these adjustments are made above 65° C., discoloration of the aqueous coating can occur, though the coating is not otherwise adversely affected. A final solution solids of about 50 to 60 percent and a final pH of about 8.5 have been found convenient for most coating applications.

As indicated, a variety of modifying agents can be employed as portions of the coating compositions of the present invention. Among the modifying agents most frequently used are co-solvents for the water in the formation of the complexer or final coating composition. Primarily, these co-solvents control foam and viscosity. Among the solvents which can be employed are alcohols including primary and secondary alcohols through $C_{10}$ such as ethanol, isopropanol, butanol, etc. Isopropanol is particularly preferred. Tertiary alcohols through $C_6$ can also be employed. Aliphatic esters such as methyl, ethyl, propyl, n-butyl, sec-butyl, and sec-amyl acetate can be effectively employed. Also useful as co-solvents are ketones such as acetone, methyl ethyl ketone, diethyl ketone, methyl isobutyl ketone, cyclohexanone, and diacetone alcohol. Other possible co-solvents are ethylene glycol monoethyl ether and its higher homologs, ethylene glycol monoethyl ether acetate, and monoethyl and monobutyl ethers of diethylene glycol and related glycol-ethers. In addition, aromatics, such as toluene, and aliphatic solvents, such as heptane, can be used. The criteria as to the type of co-solvent are the end use of the material and the desire to avoid pollution of the environment, generally. The major problem with the use of solvents which are not compatible with water is a decrease in the subsequent aqueous dilutability.

The amount and type of solvent is regulated so as to give the final coating desired properties, depending upon its end use. In general, a preferred level of co-solvent is from about 4 to 12 percent, by weight, based upon the volatiles in the final coating.

Antifoam agents are particularly useful in formation of the final coating composition of the present invention as an aid in application of the composition. While various of the co-solvents previously referred to can influence the foaming tendencies of the coating composition, specialized anti-foam agents are particularly useful. The silicone antifoam materials have proven most effective.

The modifying agents previously referred to are not to be considered exhaustive of those which may be employed. In general, modifying agents to achieve various properties can be employed so long as they do not interfere with formation of the complexer or coordination of the complexer with the acid resin. For example, other modifying agents include waxes and anti-slip agents, perfumed odor maskers, thickeners, fungicides, and metallic dryers, such as naphthenate soaps or resinates of cobalt and zirconium.

Frequently, depending upon the application, it has been found useful to employ certain other acidic resins in conjunction with the preferred polyester acidic resins in forming the coating compositions of the present invention. Among the additional acidic resins are low molecular weight copolymers produced by the addition polymerization of ethylenically unsaturated mono- and di-carboxylic acids and hydrocarbons. A preferred group is the reaction product of an $\alpha,\beta$-ethylenically unsaturated discarboxylic acid and a vinyl benzene hydrocarbon, preferably styrene-maleic anhydride copolymers and their partial esters. Such copolymers, prior to any esterification, have a molar ratio of polymerized vinyl benzene hydrocarbon to polymerized anhydride of about 1:1 to 5:1 and an average molecular weight of from about 500 to 5,000.

A second preferred group of additional acidic resins is the polymerization product of acrylic, methacrylic, and/or itaconic acid and their partial esters. Included within this group are those copolymers which include another copolymerizable monoethylenically unsaturated compound which contains a single vinylidene group. Such compounds include styrene, vinyl toluene, vinyl naphthalene, and alkyl esters of acrylic and methacrylic acid.

To be useful in the present invention, such resins must be capable of dispersion in water containing ammonia, through salt formation or neutralization of the polymer's free carboxyl groups.

As indicated, these acidic resins are additional and may be used at levels of from about 0 to 60 percent, based upon the main, preferred, polyester acid resin. When used, the amount is preferably from about 30 to 50 percent, by weight. When these additional acidic resins are used in conjunction with the preferred acidic resins of the present invention, the resulting coatings may have improved performance properties including abrasion resistance, toughness, film color, and solvent resistance. The use of the co-acidic resins is determined by the properties desired in the final coating composition and by reasons of economy.

The aqueous coating compositions of the present invention have a number of novel, desirable, or important properties which distinguish them from the coating compositions of the prior art. For example, it is a general characteristic of aqueous solutions of organic resins of the prior art that there is a rapid increase in the viscosity of the aqueous solution as the molecular weight of the resin is increased. For that reason, use of aqueous solutions of many of such resins and polymers has been restricted in many applications because of the inability to achieve workable viscosities and solids contents at a molecular weight which will provide necessary properties, such as adequate film cohesion and block resistance. In accordance with the present invention, the coating compositions are capable of providing films of improved cohesion and adhesion, when deposited from an aqueous solution, while maintaining a low viscosity.

Further, as previously indicated with regard to co-solvents, the aqueous coating compositions of the present invention have a high dilutability with water-insoluble organic solvents. This may provide a variety of advantages in application of the composition.

For printing inks, as well as other uses, an important property of the coating composition is its dry rate. This is the rate at which tack-free films will form when the coating composition is applied as a thin coating to a suitable substrate. Most ammoniacal solutions of polymers and resins have a relatively slow dry rate when compared to emulsion polymers. This difference is in addition to the reduction in dry rate realized when water is used as the coating vehicle, rather than highly voltile organic solvents. The coating composition of the present invention is an aqueous resin solution which has a high rate of dry when compared to simple ammoniacal solutions of the resin component independent of the complexer.

Many of the coating compositions of the prior art, such as those referred to in the patents already issued, excluding those of my invention, have been capable of forming films with increased water resistivity. However, in general, the applications have been restricted to those where high solids contents, e.g., 50 percent or greater, were not required or where a high basicity, such as pH greater than 9, could be tolerated. The coating composition of the present invention can have a high solids content and low viscosity in an aqueous resin solution and provide stable dispersions at a pH tolerable to most organic pigments and dyes.

The resinous vehicles of the present invention are particularly valuable for forming water reducible fluid inks for flexographic and rotogravure printing. For most purposes, these inks are low-viscosity substances composed of two essential components, the resinous vehicle and a colorant. The vehicle according to the present invention is a liquid, while the colorant is a solid. The vehicle is particularly important in the inks as its acts as a carrier for the coloring ingredients and as a binder to affix that color to the printed surface. The colorant, if soluble in the vehicle, is called a dye, while if insoluble, it is referred to as a pigment or as a lake.

In water-based inks, the solvent in the vehicle is water, either alone or combined with an organic co-solvent. Alcohols are common co-solvents for this purpose. While the water-based inks are, obviously, miscible with water, in most applications, the dried ink film must be water-insoluble. Presently known water inks lack gloss, have a slow dry rate, have poor stability, lack rapid re-solubilization of the cured ink or vehicle in itself, and exhibit poor holdout on porous stock, when compared with inks made with an organic solvent. In gravure printing, much of the paper employed is very sensitive to water, and groundwood stock tends to swell and pucker when water-based inks are used. The coating on many paper stocks is softened and lifted by these water-based inks, causing offset on the printing press. Employing the resinous vehicles of the present invention, however, many of these inherent disadvantages and limitations are overcome.

The methods employed to formulate the inks from the resinous vehicles of the present invention are well known to those skilled in the art. Dispersion of the pigment in the aqueous vehicle may be accomplished by a number of conventional methods including grinding in a sand or shot mill, as well as in a conventional ball mill. By judiciously selecting the amount of resinous vehicle used with a particular pigment, good grinding action can generally be obtained without difficulty. Suitable pigments for use with the resinous vehicle of the present invention include titanium dioxide, molybdate orange, chrome yellow, primrose yellow, benzidine yellow, barium lithol, calcium lithol, bonadur maroon, rhodamine, clays, extender pigments, ultramarine blue, cyan blue, maratex blue, milori blue, victoria blue, cyan green, channel black, furnace black, and various fluorescent pigments. The particular pigment selected is determined by the color desired, the end use, the characteristics of the substrate to which the ink is to be applied, and the stability of the pigment, both alone and in combination with the other materials of the ink.

In addition to the referenced essential components of the inks, the resinous vehicle and the colorant, various modifying agents can additionally be added. These modifying agents include waxes, slip agents such as beeswax, paraffin, or polyethylene, antifoam agents, surfactants, and wetting agents, etc. The use of these and other modifying agents for inks are well known in the art.

In order that those skilled in the art may be better enabled to practice the present invention, the following examples are given by way of illustration, and not by way of limitation. In these examples, various tests and parameters are indicated, and these are determined by the methods indicated below:

1. Percent Solids in Vehicle Solution—The determination is made using an OHAUS moisture balance. The values indicate the weight percent of non-volatile materials contained in the aqueous solution.

2. Gardner Color—This test is made according to ASTM Test Method D-1544, Test for Color of Transparent Liquids.

3. pH—This determination is by ASTM Method E-70, pH of Aqueous Solutions With the Glass Electrode.

4. Viscosity G/H—This is a determination of viscosity according to the Gardner-Holt bubble viscometer. This involves a comparative viscosity method included in ASTM D-1545, Test for Viscosity by Bubble Time Method.

5. Water Reducibility—This is defined as the grams of water required to reach a cloud point when added to 15 grams of a 50±1 percent solids sample of an aqueous solution of a resin.

6. Acid Number—This is determined by ASTM D-1639-27, Acid Value of Organic Coating Materials.

7. Amine Number—ASTM D-2074-29, Total, Primary, Secondary and Tertiary Amine Values of Fatty Amines by Alternate Indicator Method.

For evaluation of various coating compositions according to the present invention as ink carriers, barium lithol was used as the ink pigment. This selection was made because barium lithol has a tendency to give highly thixotropic and troublesome aqueous dispersions. To standardize test conditions, a base grind of the barium lithol was prepared and various test resins and coating compositions were added to it. Only the solid portion of the aqueous pigment base and the aqueous test varnish are considered. In comparing the inks to each other the following test measurements were employed:

1. Gloss, 60°—This is determined according to ASTM Method D-523, Specular Gloss at 60°. Films to be measured are prepared from a 3-mil wet film of the ink on file folder stock. The films are prepared from a Bird-Film Applicator and measurements are taken after 24 hours of drying under ambient conditions 2. Wet/Rub Abrasion, Cycles—This test was devised to measure the relative water resistivity of films under conditions of mild abrasion. The apparatus, essentially, is a felt-covered block connected through a drive mechanism to a motor so that it travels a reciprocating path at a rate of 37 cycles per minute. The basic apparatus is described in FTMS 141, Method 6141, Washability of Paints.

3. Dry Rate, Mils—This test was developed to determine the relative dry rates of coating compositions applied, and the inks prepared from them. Similar tests are employed in the industry. The test method involves the tendency of a wet ink film to transfer from one surface to another. A dispersion gauge is used to cast an initial film. The gauge, specified in ASTM Method D-1210, Fineness of Dispersion of Pigment-Vehicle Systems, consists of a steel block about 180 mm. long, 63.4 mm. wide, and 12.7 mm. thick. A wedge-shaped channel is cut down the block tapering from 4 mils at the deep end to zero at the other end. A scraper is provided with the gauge. An excess of sample ink is placed in the deep end of the channel and the excess is drawn down to the shallow end with the scraper. After a ten second interval, a paper sheet is laid over the block and pressed using a litho hand proofer. The paper is then removed and allowed to dry for 15 seconds. It is folded over upon itself and again pressed with a hand proofer. The resulting offset of ink is then read to the nearest 0.1 mil, with the test value indicating depth, to the nearest 0.1 mil, of wet ink on the gauge where transfer failed to occur. This value is indicative of dry rates which could be anticipated from the ink on a printing press. The test has been found to be reproducible 4. Viscosity, F/S—Measurements are made using a Brookfield Thermosel Chamber and are read in cps. The term F/S refers to the ink solids, full strength, and indicates an ink prepared, but at a higher viscosity than allowable by the printing method. Inks adjusted to press viscosity are referred to as press ready.

EXAMPLE 1

To a suitable vessel were added, by weight, 225 parts water, 134.1 parts triethylene tetramine, 18.7 parts zinc oxide, and 72.2 parts isophthalic acid. The mixture was heated with agitation to about 85° C. and was held at that temperature until a clear solution was obtained.

In a second vessel, a rosin-maleic modified alkyd resin having an acid number of 95 was dispersed in water by formation of a partial ammonia salt. This resin had the following composition:

| Component | Parts by Weight |
| --- | --- |
| tall oil fatty acid | 26.7 |
| rosin-fumarate | 15.7 |
| trimellitic anhydride | 27.4 |
| adipic acid | 6.9 |
| propylene glycol | 23.3 |

The rosin fumarate employed is commercially available from Union Camp Corporation under the trade name "Unirez" 7019. The material has the following properties:

| Property Identification | Value |
| --- | --- |
| melting point, ring and ball | 135°-145° C. |
| viscosity, Gardner-Holdt, 60% in toluene | X-Z 1 |
| color, 60% in toluene, ASTM D 1544-65T | 10 maximum |
| acid number | 245-255 |
| pounds per gallon | 9.4 ± 0.1 |

The acidic resin was prepared by charging the components to a suitably equipped resin reaction flask and heating at 232° C. until the desired acid number was obtained. An ammoniacal dispersion of this resin consisting of 1,594 parts resin, 68 parts 26° ammonium hydroxide, and 1,330 parts water, all by weight, was prepared.

The contents of the two vessels were blended and the pH and non-volatiles adjusted with 200 parts 26° ammonium hydroxide and water, as required. After completion, the aqueous varnish was found to be homogeneous and stable, with the following physical properties:

| Property | Value |
|---|---|
| percent solids | 49.9 |
| viscosity, Gardner-Holdt | S+ |
| color, Gardner | 12 |
| pH at 25° C. | 8.5 |
| density, pounds/gallon | 9.2 |

The coating composition of the present invention was compared to a simple ammoniacal solution of the acidic resin used in its preparation. This comparison was accomplished by forming an ink from a barium lithol (red) aqueous dispersion at a pigment-to-resin ratio of 1:1.5. Coating results showed the composition of this invention to be superior in wet/rub abrasion and dry rate, based upon the following:

| Type of Resin Vehicle | Wet/Rub Abrasion | Dry Rate |
|---|---|---|
| ammoniacal solution of acidic resin | 9 cycles | 0.5 |
| resin vehicle of present invention | >3,000 cycles | 0.8 |

Additionally, the solvent resistance and toughness of the coating formed with the resin vehicle of the present invention were found to be superior, and the inks were found to have preferred printing characteristics with excellent transfer and carry.

EXAMPLE 2

An acidic resin was prepared by reacting 30 parts of WG (government color standard) gum rosin, 70 parts of tall oil rosin ("Unitol" NCY—commercial grade sold by Union Camp Corporation, Wayne, New Jersey) and 22 parts fumaric acid, all by weight, together in a suitable resin reaction vessel at temperatures to 210° C. for 1¼ hours. The reaction product was then partially esterified with propylene glycol at 225°-230° C. to an acid number of 228. Upon discharge from the reaction vessel and cooling, the brittle resin was found to have a ring-and-ball melting point of 136° C. and an acid number of 225.

This resin was employed to prepare a homogeneous, aqueous varnish according to the present invention. To a suitable reaction vessel equipped with means for agitation, a thermometer, a reflux condenser, and a source of heat, were added 431.3 parts water, 146.0 parts isopropyl alcohol, and 67 parts triethylene tetramine, all by weight. This mixture was heated to 50° C. with agitation, and 30 parts zinc oxide, 31 parts lauric acid, and 27.4 parts Century 1220 triple-pressed stearic acid were added, in that order. Heating was continued to reflux, approximately 82° to 84° C., and the mixture was held at reflux for 1½ hours. The reaction product, a white, milky dispersion, was then cooled to 70° C., and 54.2 parts 26° ammonium hydroxide were added. To this reaction mixture were added 541 parts of the previously described acidic resin. The contents were again heated to reflux for a period of ½ hour. Upon cooling to 65° C., the product appeared as a milky resin dispersion which, upon the addition of 37.7 parts 26° ammonium hydroxide, formed a clear, homogeneous solution. To this solution were added 0.5 part of a silicone antifoam agent. The pH and non-volatile content were then adjusted with 34 parts ammonia and isopropyl alcohol as required to achieve a 50 percent solids coating composition having a pH of 8.5.

Upon cooling to room temperature, the product was found to be freeze-thaw and mechanically stable. The aqueous coating composition of the present invention was compared with a coating composition of a simple ammoniacal solution of the partial ester of the reaction product of the Diels-Alder adduct of the rosin and fumaric acid as described for the resin of this example. The aqueous compositions were evaluated employing previously described test procedures. The observations were made on the coating solutions and the coatings after being made into a barium lithol ink employing a pigment-to-resin ratio of 1:3. The results of these tests are shown in Table 1. As can be seen from Table 1, the coating composition of the present invention showed outstanding improvement in dry rate and wet/rub abrasion. In addition, improved surface toughness and decreased penetration of porous substrates were demonstrated, both properties being highly desirable for printing inks. The coating composition of the present invention was also found to have excellent rotogravure printing characteristics.

TABLE 1

| Property | Ammoniacal Solution of Partial Ester of Reaction Product of Diels-Alder Adduct of Rosin and Fumaric Acid | Coating Composition of Present Invention |
|---|---|---|
| Varnish | | |
| percent non-volatiles | 49.5 | 49.5 |
| viscosity, Gardner-Holdt | L+ | J+ |
| color, Gardner | 12+ | 12 |
| water tolerance | >200 | 110/200 |
| isopropanol tolerance | >200 | 85 |
| Ink | | |
| dry rate | 0.8 | 2.0 |
| wet/rub abrasion, 24 hours | 70 cycles | 214 cycles |
| viscosity, F/S, cps | 740 | 390 |

EXAMPLE 3

Two commercially available alcohol-soluble, rosin-maleic resins were used to compare the coating compositions of this invention with those of the prior art. The acidic resins used, sold by Union Camp Corporation, are designated "Unirez" 7019 and "Unirez" 7080. The properties of "Unirez" 7019 have been given in Example 1. The corresponding properties of "Unirez" 7080 are:

| Property | Value |
|---|---|
| melting point, ring and ball | 120°-140° C. |
| viscosity, Gardner-Holdt, 60% in ethanol | EK |
| color, 60% in ethanol, ASTM | 11 maximum |
| acid number | 125-140 |
| pounds per gallon | 9.8-10.1 |

Ammoniacal solutions of each resin were prepared employing a co-solvent, water, ammonia, an antifoam agent in the same ratios for each of the materials studied in this example. In preparing the ammoniacal solution of "Unirez" 7080, it was necessary to reduce the solids level to 45 percent and increase the co-solvent, due to the excessive solution viscosity. Inks were prepared from the various solutions and compared to the aqueous compositions of this invention by addition of the acidic resins to a complexing agent employing the method and composition of Example 2.

Inks were prepared from each of the aqueous varnishes described by reducing a standard barium lithol (red) grind base to a ratio of 1 part of red pigment to 3 parts of resin solids and evaluating for ink properties. Table 2 indicates the essential differences between the commercially available acidic resins and their use as a portion of a resinous vehicle according to the present invention. The application and evaluation of these materials were in accordance with the methods already described.

The varnish results show significant differences in the solubility characteristics of the resin when compared with the composition of the present invention. Further, it was demonstrated that the acidic resins in combination with the complexing agent showed descreased solubility with increased temperature, this property being of particular value in printing inks where heated air is employed to dry the resulting films.

It was further observed that both the clear and pigmented coatings of this invention show markedly less penetration of highly porous substrates, such as groundwood or news-print paper stock, when compared to similar uses of the standard resin solutions. As indicated in Table 2, the compositions of the present invention also show significantly improved wet and dry/rub abrasion in the final film, improving with age, unlike standard commercial resins.

-continued

| Abbreviation | Material |
| --- | --- |
| Dimer 18 | A polymerization product of $C_{18}$ fatty acids containing a mixture of dimer and trimer fatty acids. |
| U-7019 | "Unirez" 7019 as previously described |
| U-7080 | "Unirez" 7080 as previously described |
| DPSA | Double pressed stearic acid |
| SPSA | Single pressed stearic acid |
| IPA | Isopropanol |
| N-PA | N-propanol |

The aqueous coating compositions defined in Table 3 were found to provide differing properties in both the clear and pigmented forms, and to give improved usefulness in different printing and coating applications. All were superior to the unmodified acidic resin in essential properties. The test results, including viscosity, water tolerance, isopropanol tolerance, gloss, dry rate, and wet/rub abrasion resistance, are shown in Table 4, along with a recommendation for the type of printing in which the ink can be used.

The coatings of Runs c, f, and h were found to be particularly useful in rotogravure printing and gave dry rates significantly higher than those of the other runs, while the coating compositions of Runs c, e, and g gave higher wet/rub abrasion and gave the excellent transfer properties required for flexographic printing. In all cases, the properties were superior to those of the unmodified varnish formed of the acidic resin in aqueous ammoniacal solution.

Despite the apparent high gloss of the acidic resin without the complexing agent, as shown in Run a, actual printing onto a porous substrate employing this composition resulted in a very low finish compared to

TABLE 2

| "Unirez" Resin Type | Complexer | Water-Tolerance | Isopropanol Tolerance | Gloss | Dry-Rate | Wet/Rub Abrasion |
| --- | --- | --- | --- | --- | --- | --- |
| 7019 | none | 110/22 200 | 54/86 | 57 | 0.7 | 86 |
| 7019 | as in Ex. 20 | 87/>200 | 76/145 | 66 | 1.4 | 274 |
| 7080 | none | >200 | 50/84 | 59 | 0.8 | 52 |
| 7080 | as in Ex. 20 | >200 | 65/150 | 75 | 1.9 | 224 |

EXAMPLE 4

The variations possible with a single acidic resin, employing varying complexing agent compositions, are illustrated in this example. A series of aqueous coating compositions was prepared employing the acidic resin and method of formation described in Example 2.

The compositions prepared are set forth in Table 3, where each coating composition was formed at 50±1 percent solids, by weight, and at a pH of 8.5±0.1. The various weight percentages set forth in the table are based upon that solids composition, and the amount of ammonia is based upon anhydrous ammonia. In the table, the following abbreviations are used:

| Abbreviation | Material |
| --- | --- |
| TETA | Triethylene tetramine |
| TEPA | Tetraethylene pentamine |
| H-5014 | Hystrene 5014 manufactured by Humko Products. This is a mixture of saturated fatty acids containing approximately 50% lauric acid, particularly 3% max. $C_8$, 21-24% $C_{12}$, 48-57% $C_{14}$, 15% max. $C_{16}$, and 11-19.5% $C_{18}$ acids. It has an acid number of from 240 to 251 and a saponification number of from 241 to 252. | the coatings having the complexing agent in accordance with the present invention, due to the almost total lack of holdout on such substrates. A novel property of the composition of the present invention is the ability to produce aqueous coatings of improved holdout on paper, board, and carton stock. This improved holdout allows for aqueous printing at multi-stations, with practically no loss of dimensional stability in the paper substrate.

The coating formed from the composition of Run d was particularly useful in clear film as an over-print varnish on top lacquers. An important requirement of this type of coating is dry abrasion resistance. Optimum abrasion resistance was obtained by incorporating a level of from 1 to 3 percent wax, or a wax compound, based upon the weight of the vehicle, into such a coating composition. Most commercial waxes and slip agents were found to be readily dispersed in the coating, including alcohol-dispersed polyethylene, wax emulsions, and micronized waxes. Such compositions were also found to be useful for forming coatings on non-porous substrates, wood, and fiberboard, and were particularly advantageous when applied by printing, such as by rotogravure or flexographic printing methods.

TABLE 3

COMPLEXING AGENT VARIATIONS IN AQUEOUS COATINGS PREPARED USING ACIDIC RESIN OF EXAMPLE 2

| | Complexer Composition | | | | | | | |
|---|---|---|---|---|---|---|---|---|
| | Polyamine | | Zinc | Acid Modifiers | | Resin | Ammonia | Cosolvent | |
| Run | Type | Wt. % | Wt. % | Type | Wt. % | Wt. % | Wt. % | Type | Wt. % |
| a | | | —none— | | | 49.97 | 3.11 | IPA | 10.05 |
| b | TETA | 4.61 | 0.81 | H-5014 | 1.60 | 37.88 | 1.85 | IPA | 8.24 |
| | | | | Dimer 18 | 3.53 | | | | |
| | | | | U-7019 | 0.91 | | | | |
| c | TETA | 4.87 | 2.18 | Lauric | 2.23 | 38.48 | 1.89 | IPA | 1.52 |
| | | | | DPSA | 2.00 | | | | |
| d | TETA | 4.18 | 2.01 | DPSA | 4.87 | 35.72 | 1.87 | IPA | 10.47 |
| | TEPA | 1.08 | | U-7080 | 2.28 | | | | |
| e | TETA | 4.67 | 0.82 | H-5014 | 1.60 | 37.88 | 1.85 | none | none |
| | | | | Dimer 18 | 3.53 | | | | |
| f | TETA | 5.32 | 2.38 | none | none | 42.03 | 207 | IPA | 10.52 |
| g | TETA | 4.61 | 0.81 | IPA | 1.58 | 37.33 | 1.85 | n-PA | 8.15 |
| | | | | Dimer 18 | 3.48 | | | | |
| | | | | Rosin | 0.91 | | | | |
| h | TETA | 4.87 | 2.18 | SPSA | 2.97 | 38.47 | 1.89 | IPA | 10.52 |
| | | | | TOFA* | 1.26 | | | | |

TOFA*-tall oil fatty acid

TABLE 4

EFFECTS ON COATING PROPERTIES OF VARIOUS COMPLEXING AGENTS

| | Aqueous Coating | | | Pigment- | Ink Coating Properties | | | | |
|---|---|---|---|---|---|---|---|---|---|
| Run | Vis-cosity | Water Tolerance | Isopropanol Tolerance | to-Resin Ratio | Viscos-ity F/S | Gloss | Dry Rate | Wet/Rub Abrasion | Recommended Ink Use |
| a | J+ | 110/>200 | 55/90 | 1/3 | 390 | 60 | 0.8 | 70 | — |
| b | M | 95/>200 | 85/160 | 1/2 | 470 | 54 | 1.0 | 586 | Flexography |
| c | K+ | >200 | >200 | 1/3 | 525 | 70 | 1.7 | 364 | Rotogravure |
| d | J— | >200 | >200 | 1/3 | 1800 | 35 | 1.9 | 374 | Clear top lacquer Gravure or Flexography |
| e | V-W | 67/>200 | 85/160 | 1/2 | 770 | 53 | 1.1 | 794 | Flexography |
| f | N | 60/>200 | >200 | 1/3 | 760 | 40 | 2.0 | 272 | Rotogravure |
| g | S | >200 | >200 | 1/2 | 1300 | 35 | 1.2 | 366 | Flexography |
| h | O | >200 | >200 | 1/3 | 1910 | 22 | 1.8 | 340 | Rotogravure |

EXAMPLE 5

A preferred acidic resin for use in the composition of the present invention was formed by reacting 1,122 parts tall oil resin, 2.4 sulfuric acid, 1.1 parts phosphoric acid, and 247 parts fumaric acid, all by weight, at a temperature of 210° C. for 1½ hours. On completion of that reaction, 28 parts, by weight, of pentaerythritol were added and were reacted with the acid at a temperature of about 230° C. to a final acid number of 235. The reaction product had a ring-and-ball melting point of 136° C.

Sixteen parts anhydrous ammonia and 584 parts of the acid resin of this example were added to 77.11 parts of a complexing agent formed according to the method of Example 2. This complexing agent was composed of 480 parts water, 149 parts isopropyl alcohol, 67.5 parts piperazine, 24.5 parts zinc oxide, 32.7 parts Hystrene 5014, 17.4 parts isophthalic acid. All parts set forth herein are by weight. The mixture was heated to reflux for 1½ hours to allow for the formation of a homogeneous dispersion of the resin. The reaction product was then cooled to 75° C., and 0.5 part of a silicone antifoam agent was added. The dispersion was further cooled to 65° C., and 10.6 parts additional anhydrous ammonia were added. Twenty-eight parts water, ammonia, and isopropyl alcohol were added so as to adjust the solids, pH, and viscosity.

The final coating composition was found to be a stable, homogeneous, aqueous, resin solution having a viscosity of O, Gardner-Holdt, a Gardner color of 10, a pH of 8.4, and a solids percentage of 49.5. Coatings formed from this composition, both clear and pigmented, showed a high degree of gloss, dry rate, and wet/rub abrasion resistance, when compared to acidic resins without the complexing agent.

EXAMPLE 6

The acidic resin described in Example 5 was employed in preparing a series of aqueous resinous coating vehicles employing different complexing agents formed from the preferred polyamine, TETA, and various co-hydrocarbon amines. These resinous vehicles were found to be both homogeneous and stable, and were also found to provide coatings of improved dry rate, wet/rub abrasion resistance, and toughness, and to be otherwise superior as coating composition when compared to use of the acidic resin without the complexing agent employed according to the present invention.

Table 5 indicates the mixture of preferred polyamine and co-hydrocarbon amine employed, and the equivalents of those amines, the type of acid modifier employed, and the equivalents of that acid modifier, the molar ratio of the polyamine/co-hydrocarbon amine to zinc, where the zinc is employed as zinc oxide, the ratio of acid equivalents to moles of polyamine present, the dry rate, and the wet/rub abrasion resistance. The equivalents in Table 5, for the amine, are based upon the hydrochloric acid titratable amine number, such that, for example, the equivalent weight for triethylene tetramine is 36.65.

Abbreviations are used for the various amines and acids in Table 5. Definitions have already been given for TETA, TEPA, DPSA, H-5014, and U-5080. The remaining abbreviations are:

with no apparent bleeding at failure. Other properties were also found to be improved.

TABLE 5

| Amine | | Acid Modifier | | Mole Ratio | Ratio Equivalents Acid/ | Dry | Wet/Rub |
|---|---|---|---|---|---|---|---|
| Equiv. | Type | Equiv. | Type | Polyamine/Zn | Moles Polyamine | Rate | Abrasion |
| 0.4068 | TETA | 0.1099 | H-5014 | 2.41 | 0.508 | 1.7 | 180 |
| 0.7990 | piperazine | 0.1445 | IA | | | | |
| 1.0211 | TETA | 0.1010 | H-5014 | 1.49 | 0.996 | 1.9 | 150 |
| 0.2204 | BAPA | 0.1445 | IA | | | | |
| 1.0391 | TETA | 0.1119 | H-5014 | 1.57 | 0.785 | 1.5 | 200 |
| 0.3611 | IBPA | 0.1472 | IA | | | | |
| 1.0391 | TETA | 0.1712 | H-5014 | 1.53 | 0.529 | 1.7 | 190 |
| 0.2604 | MBPA | | | | | | |
| 0.7920 | TETA | 0.2831 | DPSA | 1.38 | 0.6760 | 1.6 | 200 |
| 0.1981 | TEPA | 0.0367 | U-7080 | | | | |
| 0.9407 | TETA | 0.2831 | DPSA | 1.39 | 0.522 | 1.8 | 190 |
| 1.1072 | TETA | 0.1715 | H-5014 | 1.41 | 0.530 | 1.9 | 390 |
| 0.0944 | DACH | | | | | | |
| 0.6768 | TETA | 0.1784 | H-5014 | 1.40 | 9.534 | 2.0 | 175 |
| 0.3303 | DACH | | | | | | |
| 0.9720 | TETA | 0.1506 | H-5014 | 1.48 | 0.502 | 1.8 | 275 |
| 0.1717 | BHMT | | | | | | |
| 0.7188 | TETA | 0.1354 | H-5014 | 1.84 | 0.405 | 1.6 | 260 |
| 0.3102 | DCA | | | | | | |

| Abbreviation | Material |
|---|---|
| BAPA | Bis(aminopropyl)piperazine |
| MBPA | Methylaminobisopropylamine |
| IBPA | Iminobispropylamine |
| IA | Isophthalic acid |
| TA | C$_{18}$ oil fatty acids |
| BP | Bisphenol A |
| DACH | Overhead Bi-Product from Production of Diamino Cyclohexane |
| BHMT | Stripper Bottoms from Production of Bishexamethylene Triamine |
| DCD | Crude Overhead--DACH Type from Production of Diaminocyclo Hexane |

The overhead or bottoms by-products of amine production, described here, are generally useful for reasons of economy. These materials are secondary, or by-products, of amine production and are usually dark in color and low in cost. The amine equivalent weight of these by-products are given in the following table:

| Abbreviation | Amine Equivalent Weight |
|---|---|
| DACH | 57.5 |
| BHMT | 98.9 |
| DCD | 100.0 |

Coating compositions were formed with the complexing agent, in accordance with the present invention, and employing the base acidic resin formed into a 50 percent non-volatile, aqueous ammoniacal solution employing 10 percent by weight isopropanol as a co-solvent, and the same level of modifying agents as used in Example 5.

Films were formed from the various coating compositions and were evaluated for dry rate and wet/rub abrasion resistance using the standard test procedures. The film of the acidic resin, without the complexing agent, gave a dry rate of 0.8 mil and a wet/rub abrasion resistance of 62 cycles, with excessive bleeding of the pigmented coating at failure. As can be seen from Table 5, the coatings using the complexing agent and acid resin, in accordance with the present invention, gave improved dry rates and wet/rub abrasion resistance

EXAMPLE 7

In the composition of Example 2, 22.4 weight percent of the zinc oxide was replaced with an equal amount of lithium hydroxide, without otherwise changing the composition. The ink formed from the coating composition thus prepared showed a 20 percent decrease in viscosity and a 35 percent increase in gloss of the dried film, when compared with the film formed from the composition of Example 2. The wet/rub abrasion resistance was reduced from 241 to 150 cycles, and the alcohol reducibility was lowered by 40 percent.

EXAMPLE 8

In the composition of Example 2, 11.2 weight percent of the zinc oxide was replaced with an equal amount of magnesium oxide. The viscosity of both clear and pigmented coating compositions was reduced, while the dry rate was increased. Increase in the dry rate was considered desirable.

EXAMPLE 9

To a Parr reaction vessel, equipped with an agitator, thermometer, and heat source, were charged, at room temperature, 746 parts of the complexing agent prepared according to the method of Example 2 and 539 parts of the acidic resin of Example 2, all parts being by weight. The mixture was heated to a temperature of 135° C. and a pressure of 70 p.s.i. After 1 hour, the mixture was cooled to 60° C., and 91.4 parts, by weight, 26° ammonium hydroxide were added and the mixture was stirred for 1 hour. The final coating composition showed properties equivalent to the material of Example 2.

The method employed according to this example illustrates an alternate method of preparing the preferred coating composition and demonstrates that the first ammonia incorporated into the complexing agent with the acidic resin is employed merely to achieve a workable dispersion.

EXAMPLE 10

An acidic resin for use in forming an aqueous vehicle according to the present invention was formed from 456 parts tall oil fatty acid ("Unitol GMS"—a commercial grade of tall oil fatty acid sold by Union Camp Corporation, Wayne, NJ) 277 parts trimethylol propane, 264 parts isophthalic acid, and 87 parts trimellitic anhydride. These materials were reacted together to an acid number of 65 and, after cooling to room temperature, 70 parts of this resin were combined with 30 parts of a resin-fumarate and formed into an aqueous solution according to the method of Example 1. The aqueous acidic resin blend was adjusted to a pH of 7.0 and a solids content of 50 percent, by weight. One hundred parts of the aqueous, ammoniacal solution were combined with 10 parts of a complexing agent formed from 14.6 parts zinc octoate, 10 parts diethylene triamine, and 10 parts water, all by weight, according to the method of Example 1. The final coating composition was adjusted to a pH of 8.2 and the solution solids to 55 percent, by weight. Films formed from this coating composition showed greatly improved water resistance and toughness. In both clear and pigmented films, it was found that about 7 days were required to achieve optimum properties.

EXAMPLE 11

This example illustrates how wet/rub abrasion resistance in the final film can be varied by varying different parts of the overall composition, including the ratio of acidic resin to complexing agent and the ratio of the components of the complexing agent. The coating compositions of the present invention were formed using the acidic resin and method of Example 1, where the complexing agent was formed from zinc oxide, triethylene tetramine, and lauric acid. Four complexing agents were prepared at each of several ratios of zinc to polyamine and employing different levels of lauric acid as an acid modifier. These complexing agents were then combined with the acidic resin at varying ratios. These coating compositions were pigmented and evaluated for wet/rub abrasion resistance as previously described.

The various compositions formed according to this example, and the wet/rub abrasion resistance results, are as shown in Table 6, where TETA is as previously defined.

As can be seen from a review of the results in the table, the optimum level of complexing agent which must be employed to obtain the highest water resistivity varies according to the composition of the complexing agent. Thus, it can be seen that both changes in polyamine/zinc mole ratio and the level of acid modifier used influence the optimum ratio of complexing agent to acidic resin. Obviously, other properties are also influenced and their optimum values do not necessarily correspond to that of the wet/rub abrasion resistance.

TABLE 6

| Complexing Agent Compositio Expressed as Equivalents/100 gms. | | | Mole Ratio TETA/Zinc | Wet/Rub Abrasion, Cycles to Failure, with Variations in Complexing Agent Level (Parts/100 Parts of Acidic Resin) | | | | |
|---|---|---|---|---|---|---|---|---|
| TATA | Zinc | Lauric Acid | | 10 | 15 | 20 | 25 | 30 |
| 2.254 | 0.2202 | 0.180 | 3.43 | 303 | >3,000 | 1,100 | 712 | 84 |
| 2.053 | 0.1720 | 0.215 | 3.97 | 175 | 2,650 | 1,980 | 570 | 165 |
| 2.130 | 0.3390 | 0.171 | 2.10 | 162 | 1,250 | >3,000 | 760 | 250 |
| 1.863 | 0.4428 | 0.182 | 1.40 | 120 | 538 | 600 | 2,350 | 1,015 |

EXAMPLE 12

A coating composition of improved properties is obtained by substituting an acid copolymer of acrylic acid for the partial ester of a rosin-fumarate, as described in Example 2. The acrylic resin employed was Joncryl 67, made by S. C. Johnson and Son, Inc. of Racine, Wisconsin. The material is a solid, water-white flake with an acid value of 200, a softening point (ring & ball) of 140° C., a viscosity (Gardner-Holdt) of H (50 percent in ethanol), and a color (Gardner) of 1 max. (50 percent in ethanol).

EXAMPLE 13

A homogeneous, aqueous solution with excellent coating properties is formed by substituting 30 parts by weight of a styrene-maleic anhydride copolymer, with a molecular weight of from 1,000 to 5,000, for an equivalent part of the partial ester of the rosin-fumarate described in Example 2. Improved coating compositions are similarly obtained with the partial esters of such styrene-maleic anhydride copolymers.

EXAMPLE 14

Inks were formed from the coating composition of Example 2 employing a variety of pigments as set forth in Table 7. All of the inks described were made according to methods well known in the art and exhibited the improved properties attributed to the compositions of this invention, including a high rate of dry, high gloss, and improved dry and wet/rub abrasion resistance.

TABLE 7

| Type Pigment | Percent Pigment | Percent Resin Solids |
|---|---|---|
| Phthalocyanine blue | 25 | 75 |
| Barium lithol red | 50 | 50 |
| Calcium lithol red | 35 | 50 |
| Barium lithol red | 15 | 85 |
| Carbon black | 30 | 70 |
| Benzidine yellow | 15 | 85 |
| Primose yellow | 25 | 75 |
| Chrome yellow | 50 | 50 |
| Moly orange | 30 | 70 |

While various specific formulations have been illustrated above for pigments and coating compositions, it will be realized that these are for purposes of illustration, and the invention should not be considered as limited except in accordance with the appended claims.

I claim:

1. An improved aqueous, resinous coating composition comprising:
   (a) an acidic resin having an acid number of from 30 to 400, said resins being derived from acids selected from the class consisting of rosin, fatty acids of from 4 to 22 carbon atoms, monobasic acids, dibasic acids, polybasic acids, and esters and polyesters of these acidic materials, and combinations thereof;
   (b) a complexing agent formed of:
      (1) a method having a coordination value in excess of its valence, selected from the group consisting of zinc, zirconium, cobalt, and nickel;

(2) from 0.9 to 6 moles, per mole of metal, of a polyamine selected from the class consisting of polyalkylene polyamines having the formula:

$$NHR{\text -}[(CHR)_a NH]_n R',$$

where each R and R' is individually selected from the class consisting of hydrogen and methyl, a is from 2 to 3, and n is from 2 to 5; with from 0 to 55 percent of the polyalkylene polyamine being replaced with a co-hydrocarbon amine having an amine equivalent weight of from 35 to 120; and (3) from 0 to 1 equivalent of an acid modifier for each 0.25 to 2 moles of the polyamine of (2), said modifying acid being selected from the class consisting of monobasic acids having from 6 to 18 carbon atoms, dibasic acids having from 4 to 12 carbon atoms, aromatic acids, and polymerized $C_{18}$ fatty acids; and (c) Sufficient ammonia to provide a pH of from about 7.3 to 10.0.

2. The coating composition of claim 1 wherein the acidic resin is the Diels-Alder reaction product of rosin with an $\alpha,\beta$-unsaturated olefinic dicarboxylic acid or anhydride.

3. The coating composition of claim 2 wherein the $\alpha,\beta$-unsaturated olefinic dicarboxylic material has from 4 to 6 carbon atoms.

4. The coating composition of claim 3 wherein the acid is selected from the class consisting of maleic, fumaric, itaconic, anhydrides of such acids, and mixtures of such anhydrides and acids.

5. The coating composition of claim 4 having, in addition, at least one acid selected from the class consisting of phthalic, isophthalic, terephthalic, tetrahydrophthalic, benzoic, succinic, adipic, sebacic, and anhydrides of such acids.

6. The coating composition of claim 1 wherein the acidic resin is an oil-modified polyester resin.

7. The coating composition of claim 1 wherein the acidic resin is derived from a polyhydric alcohol selected from the class consisting of ethylene glycol, propylene glycol, butylene glycol, glycerol, pentaerythritol, and sorbitol.

8. The coating composition of claim 1 wherein the complexing agent employs, as the polyamine, polyalklene polyamine, solely.

9. The coating composition of claim 8 wherein the complexing agent is triethylene tetramine.

10. The coating composition of claim 1 wherein the complexer includes a co-hydrocarbon amine in an amount of from 20 to 45 percent based upon the total amine equivalents.

11. The coating composition of claim 10 wherein the co-hydrocarbon amine is selected from the class consisting of piperazine, bis(aminopropyl)piperazine, and bis-hexamethylene triamine.

12. The coating composition of claim 10 wherein the polyamine is piperazine.

13. The coating composition of claim 1 wherein the modifying acid is a monobasic acid having from 6 to 18 carbon atoms.

14. The coating composition of claim 13 wherein the monobasic acid has from 8 to 14 carbon atoms.

15. The coating agent of claim 14 wherein the monobasic acid has from 12 to 14 carbon atoms.

16. The coating composition of claim 15 wherein the monobasic acid is lauric acid.

17. The coating composition of claim 1 wherein the modifying acid is an aromatic acid.

18. The coating composition of claim 17 wherein the modifying acid is benzoic acid.

19. The coating composition of claim 17 wherein the modifying acid is isophthalic acid.

20. The coating composition of claim 1 wherein the modifying acid is a dibasic acid.

21. The coating composition of claim 20 wherein the modifying acid is adipic acid.

22. The coating composition of claim 1 wherein the modifying acid is a polymerized $C_{18}$ fatty acid.

23. The coating composition of claim 1 wherein the modifying acid is employed in the range of 1 equivalent of the acid for each 0.25 to 2 moles of the polyamine component of the complexing agent.

24. The coating composition of claim 23 wherein 1 acid equivalent is employed for each 0.5 to 1 mole of polyamine.

25. The coating composition of claim 1 wherein the metal is zinc.

26. The coating composition of claim 25 wherein a cometal is employed, in addition to zinc.

27. The coating composition of claim 26 wherein the cometal is selected from the class consisting of alkali and alkaline earth metals.

28. The coating composition of claim 1 wherein a co-solvent is included for a portion of the water of the aqueous composition.

29. A printing ink composition comprising:
(a) an acidic resin having an acid number of from 30 to 400, said resins being derived from acids selected from the class consisting of rosin, fatty acids of from 4 to 22 carbon atoms, monobasic acids, dibasic acids, polybasic acids, and esters and polyesters of these acidic materials, and combinations thereof;
(b) a complexing agent formed of:
 (1) a metal having a coordination value in excess of its valence, selected from the group consisting of zinc, zirconium, cobalt, and nickel;
 (2) from 0.9 to 6 moles, per mole of metal, of a polyamine selected from the class consisting of polyalkylene polyamines having the formula:

$$NHR{\text -}[(CHR)_a NH]_n R',$$

where each R and R' is individually selected from the class consisting of hydrogen and methyl, a is from 2 to 3, and n is from 2 to 5; with from 0 to 55 percent of the polyalkylene polyamine being replaced with a co-hydrocarbon amine having an amine equivalent weight of from 35 to 120; and
 (3) from 0 to 1 equivalent of an acid modifier for each 0.25 to 2 moles of the polyamine of (2), said modifying acid being selected from the class consisting of monobasic acids having from 6 to 18 carbon atoms, dibasic acids having from 4 to 12 carbon atoms, aromatic acids, and polymerized $C_{18}$ fatty acids;
(c) sufficient ammonia to provide a pH of from about 7.3 to 10.0; and
(d) a pigment dispersible in the coordinate formed from said acidic resin and said complexing agent.

30. The printing ink composition of claim 29 wherein the acidic resin is the Diels-Alder reaction product of rosin with an α,β-unsaturated olefinic dicarboxylic acid or anhydride.

31. The printing ink composition of claim 30 wherein the α,β-unsaturated olefinic dicarboxylic material has from 4 to 6 carbon atoms.

32. The printing ink composition of claim 31 wherein the acid is selected from the class consisting of maleic, fumaric, itaconic, anhydrides of such acids, and mixtures of such anhydrides and acids.

33. The printing ink composition of claim 32 having, in addition, at least one acid selected from the class consisting of phthalic, isophthalic, terephthalic, tetrahydrophthalic, benzoic, succinic, adipic, sebacic, and anhydrides of such acids.

34. The printing ink composition of claim 29 wherein the acidic resin is an oil-modified polyester resin.

35. The printing ink composition of claim 29 wherein the acidic resin is derived from a polyhydric alcohol selected from the class consisting of ethylene glycol, propylene glycol, butylene glycol, glycerol, pentaerythritol, and sorbitol.

36. The printing ink composition of claim 29 wherein the complexing agent employs, as the polyamine, polyalklene polyamine, solely.

37. The printing ink composition of claim 36 wherein the complexing agent is triethylene tetramine.

38. The printing ink composition of claim 1 wherein the complexer includes a co-hydrocarbon amine in an amount of from 20 to 45 percent based upon the total amine equivalents.

39. The printing ink composition of claim 38 wherein the polyamine is piperazine.

40. The printing ink composition of claim 29 wherein the modifying acid is a monobasic acid having from 6 to 18 carbon atoms.

41. The printing ink composition of claim 40 wherein the monobasic acid has from 8 to 14 carbon atoms.

42. The printing ink composition of claim 41 wherein the monobasic acid has from 12 to 14 carbon atoms.

43. The printing ink composition of claim 42 wherein the monobasic acid is lauric acid.

44. The printing ink composition of claim 29 wherein the modifying acid is an aromatic acid.

45. The printing ink composition of claim 44 wherein the modifying acid is benzoic acid.

46. The printing ink composition of claim 44 wherein the modifying acid is isophthalic acid.

47. The printing ink composition of claim 29 wherein the modifying acid is a dibasic acid.

48. The printing ink composition of claim 47 wherein the modifying acid is adipic acid.

49. The printing ink composition of claim 29 wherein the modifying acid is a polymerized $C_{18}$ fatty acid.

50. The printing ink composition of claim 29 wherein the modifying acid is employed in the range of 1 equivalent of the acid for each 0.25 to 2 moles of the polyamine component of the complexing agent.

51. The printing ink composition of claim 50 wherein 1 acid equivalent is employed for each 0.5 to 1 mole of polyamine.

52. The printing ink composition of claim 29 wherein the metal is zinc.

53. The printing ink composition of claim 52 wherein a cometal is employed, in addition to zinc.

54. The printing ink composition of claim 53 wherein the cometal is selected from the class consisting of alkali and alkaline earth metals.

55. The printing ink composition of claim 28 wherein a co-solvent is included for the water of the aqueous composition.

56. The printing ink composition of claim 28 wherein the pigment is a dye.

57. The printing ink composition of claim 28 wherein the pigment is a lake.

* * * * *

UNITED STATES PATENT AND TRADEMARK OFFICE
CERTIFICATE OF CORRECTION

PATENT NO. : 4,154,618

DATED : May 15, 1979

INVENTOR(S) : Roger Burke

It is certified that error appears in the above-identified patent and that said Letters Patent are hereby corrected as shown below:

at Col. 3, line 10 after the word "which" delete "is" (first occurrence).

at Col. 4, line 23, "inter alia" should be --*inter alia*--.

at Col. 4, line 35, the word "econonmy" should be --economy--.

at Col. 4 ,line 41, before the word "For" delete the "," and insert --.--.

at Col. 8, line 65, the word "describes" should be --described-- at Col. 11, line 7, delete "triamine" and insert --tetramine--.

at Col. 14, line 10, "from" should be --form--.

at Col. 15, line 39, after the word "composition" delete the "," and insert --.--.

at Col. 16, line 6, after the word "rheology" delete the "," (second occurrence).

at Col. 18, line 28, "its" should be --it--.

at Col. 23, Table 2, Column headed "Water-Tolerance", first line, "110/22 200" should be --110/7200--.

at Col. 25, Table 3, Column headed "Ammonia Wt. %" (run f) "207" should be --2.07--.

UNITED STATES PATENT AND TRADEMARK OFFICE
CERTIFICATE OF CORRECTION

PATENT NO. : 4,154,618

DATED : May 15, 1979

INVENTOR(S) : Roger Burke

It is certified that error appears in the above-identified patent and that said Letters Patent are hereby corrected as shown below:

at Col. 25, Table 3, Column Headed "Consolvent Wt. %" (run c) "1.52" should be --10.52--.

at Col. 27, First Table of Abbreviations line "TA" "$C_{18}$ oil fatty acid" should be --$C_{18}$ tall oil fatty acids--.

at Col. 27-28, Table 5, Column headed "Amine Equiv. Type" insert --0.3291 BHTA -- between 0.9407 TETA and 1.1072 TETA.

at Col. 27, Table 5, Column headed "Amine Equiv." "0.1717" should be --0.1715--.

at Col. 29, Table 6, Column Headed "TATA" should be --TETA--.

at Col. 30, line 66, Claim 1, delete "method" and insert --metal--.

Signed and Sealed this

Sixteenth Day of September 1980

[SEAL]

Attest:

SIDNEY A. DIAMOND

Attesting Officer

Commissioner of Patents and Trademarks